United States Patent [19]

Houldsworth

[11] 4,237,457

[45] Dec. 2, 1980

[54] DISPLAY APPARATUS

[75] Inventor: John Houldsworth, Yeovil, England

[73] Assignee: Elliott Brothers (London) Limited, Chelmsford, England

[21] Appl. No.: 850,231

[22] Filed: Nov. 10, 1977

[30] Foreign Application Priority Data

Nov. 15, 1976 [GB] United Kingdom ............... 47417/76

[51] Int. Cl.[2] ............................................... G06F 3/14

[52] U.S. Cl. .................................... 340/728; 340/744; 340/791; 340/793

[58] Field of Search ................ 340/324 AD, 723, 728, 340/744, 747, 748, 753, 789, 791, 798, 803; 315/383, 365

[56] References Cited

U.S. PATENT DOCUMENTS

| | | | |
|---|---|---|---|
| 3,812,491 | 5/1974 | Barraclough | 340/324 AD |
| 3,878,536 | 4/1975 | Gilliam | 340/324 AD |
| 3,921,164 | 11/1975 | Anderson | 340/324 AD |
| 4,014,011 | 3/1977 | Ashkin | 340/324 R |

FOREIGN PATENT DOCUMENTS

| | | |
|---|---|---|
| 1401022 | 7/1975 | United Kingdom . |
| 1405884 | 9/1975 | United Kingdom . |

*Primary Examiner*—Gareth D. Shaw
*Assistant Examiner*—Joel Miller
*Attorney, Agent, or Firm*—Kirschstein, Kirschstein, Ottinger & Cobrin

[57] ABSTRACT

A method of displaying a symbol on a display area which is effectively a regular array of display elements wherein the symbol is defined by a multiplicity of equally spaced points on the display area and each point is represented by a group of display elements whose relative brightnesses are set so as to create a subjective impression of that point at its required position. The technique avoids the so-called "staircase effect" on symbols. Apparatus for generating brightness control signals for carrying out the method is also disclosed.

8 Claims, 12 Drawing Figures

DISPLAY APPARATUS

This invention relates to display apparatus of the kind having a display area which is effectively a regular array of display elements on which a symbol is produced by brightening selected ones of the display elements. Such a display apparatus is hereinafter referred to a display apparatus of the kind specified.

One example of display apparatus of the kind specified comprises a cathode ray tube arranged to be line-scanned in a television-type raster with digital control of display element brightness. However, other forms of display apparatus of the kind specified are known, for example, an array of light emitting diodes arranged to be scanned electronically.

One disadvantage of a display apparatus of the kind specified is that, due to the discrete nature of the display elements, some symbol lines, e.g. those at a large or small angle to the raster lines in a line-scanned raster type display, tend to suffer from the so-called "staircase effect", that is, instead of the line having a clean straight edge it has a stepped appearance resembling the treads and risers of a staircase.

An object of this invention is to provide a method of displaying a symbol and display apparatus of the kind specified whereby this disadvantage is alleviated.

According to one aspect of the present invention a method of displaying a symbol on a display apparatus of the kind specified comprises selecting the positions of a multiplicity of equally spaced symbol points on the display area required to define said symbol, and representing each said symbol point by setting the relative brightnesses of a group of said display elements adjacent the position required for that symbol point so that said group of display elements creates a subjective impression of that symbol point at its required position.

In a preferred method in accordance with the invention each said group of display elements covers a substantially square area having sides of length equal to twice the spacing between symbol points.

In one particular such method each said group of elements comprises a three-by-three array of elements.

According to a second aspect of the present invention an apparatus for generating a brightness control signal for input to a display apparatus of the kind specified to cause the apparatus to display a symbol defined by a multiplicity of symbol points comprises: means for generating in respect of each display element in turn the brightness contribution which is required for that element in respect of each symbol point for which that element is one of a group of elements adjacent that symbol point, so that in respect of each point the respective brightnesses contributions of the elements of the associated group create a subjective impression of that point; and means for summing said brightness contributions for that element.

In one particular apparatus said generating means comprises storage means which stores all possible brightness contributions required by that element; and address means for reading out of said storage means in response to inputs defining the actual positions of symbol points the actual required brightness contributions of that element.

In such an apparatus said storage means suitably comprises a separate section for each element in a group, and each section stores the possible brightness contributions required by a particular element of the group when the symbol point is at different positions in the element corresponding to the storage section.

Each said group of elements suitably comprises a three-by-three array of elements and said particular element is the central element of the array.

Where as will normally be the case the address means is supplied sequentially with inputs representing the positions of said symbol points defining the symbol, the address means preferably incorporates delay means arranged so that each storage section is addressed simultaneously by a symbol point position input corresponding to that storage section.

The invention will now be described, by way of example, with reference to the accompanying drawings in which:

FIG. 1 comprises diagrams illustrating the apparent locations of a symbol point produced by two adjacent picture elements of a display apparatus;

FIG. 2 comprises diagrams illustrating the apparent locations of a symbol point produced by four adjacent picture elements of a display apparatus;

FIG. 3 is a graph showing the brightness contribution from a symbol point produced by adjacent picture elements;

FIG. 4 comprises two graphs showing respectively the spacing and the brightness contributions of a plurality of symbol points arranged to form a symbol line;

FIG. 5 comprises a series of graphs illustrating the brightness contributions of symbol points formed by adjacent picture element of odd and even lines of a raster display apparatus and also illustrating the brightness of the picture elements;

Figure 1:
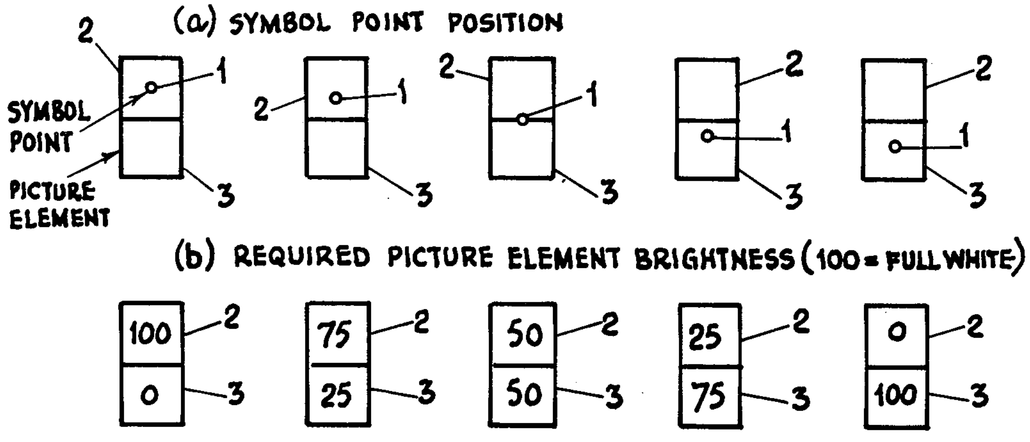

Referring in the first instance to FIG. 1, it has been discovered that if a simple symbol comprising a single bright spot or symbol point 1 is to be moved from one picture display element 2 to another adjacent picture display element 3, then by progressively decreasing the brightness of the first picture element 2 and progressively increasing the brightness of the second picture element 3, while maintaining the total brightness of the two picture elements constant, the spot or symbol point 1 will appear to move smoothly from one picture element 2 to the other picture element 3. Thus when the ratio between the respective brightnesses of the two picture elements 2 and 3 is 50:50 the two elements create a subjective impression of a symbol point located on the common boundary of the two elements, i.e. the symbol point 1 will apparently be located on the common boundary of the two elements. When the ratio between the respective brightnesses of the two picture elements 2 and 3 is 75:25 or 25:75 the symbol point 1 will apparently be located a corresponding distance within the brighter picture element, while when one or the other of the two picture elements 2 and 3 has full brightness, represented in the diagrams as 100, the symbol point 1 will apparently be located at the centre of the relevant picture element. In this way a symbol point 1 can be caused to appear to move vertically upwards, through intermediate positions, from one picture element 2 to another picture element 3, or vice versa.

Figure 2:
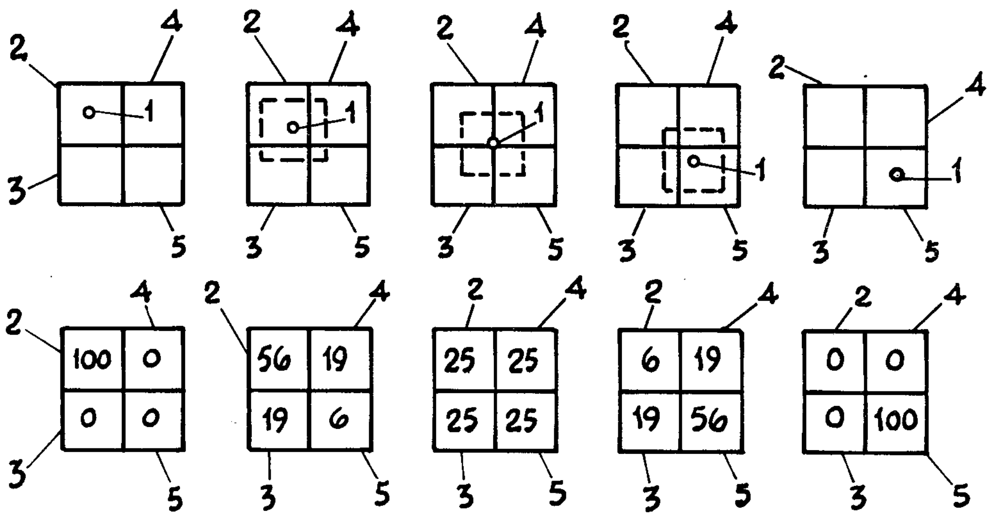

As shown in FIG. 2, the above technique can be modified to provide apparent movement of a symbol point 1 in two axes by resolving the total brightness between four adjacent picture elements 2, 3, 4, 5 arranged in a two-by-two array. As before if one of the picture elements such as 2 or 5 has full brightness then the symbol point 1 will apparently be located at the centre of that picture element. If, however, the four picture elements have equal brightness the symbol point 1 will apparently be located at the centre of the array. Other, exemplary, apparent positions of the symbol point 1 are shown in FIG. 2, and it will be appreciated that the symbol point 1 can be caused to be apparently located at other positions within the array by varying the relative brightnesses of the individual picture elements of the array while maintaining the total brightness constant.

Figure 3:
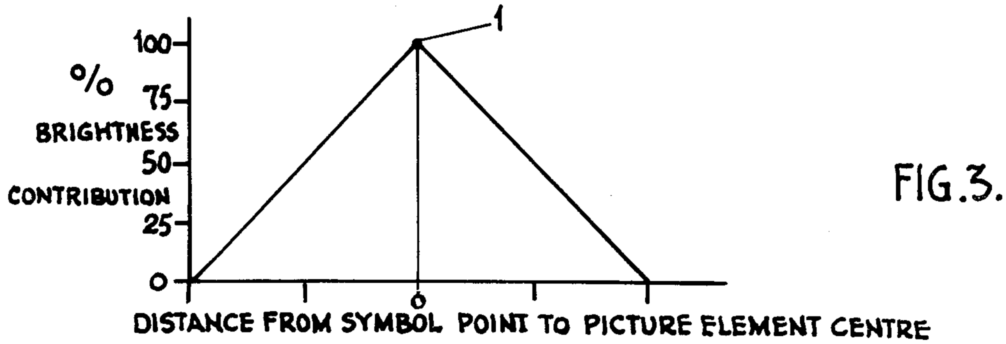

The technique can be extended to produce symbols formed by a plurality of such symbol points and its application to a 625 line, interlaced T.V. raster system to produce symbol lines having a width of one T.V. line pair will now be considered. If the display area has a one-to-one aspect ratio using 512 active lines, thus allowing both horizontal and vertical axes to be considered in the same way, the 512 picture elements per line will require a video update of 100 nanoseconds per element. Generation of brightness levels needs to be achieved at the same rate. To maintain a refresh rate of 50 Hz and hence a flicker free display, each portion of a displayed symbol should have equal contributions of brightness from the odd and even fields. This can only be achieved when the symbol lines have a width of one or more T.V. line pairs. Therefore the brightness contribution from each symbol point 1 forming part of a symbol line must extend more than one picture element either side to give a symbol width of two T.V. lines, and, as shown in FIG. 3, a symmetrical ramp dropping to zero in two picture element spacing would certainly provide such symbol width. In fact, as will be seen later, the required line width can be produced when the brightness contribution falls to zero in one and a half picture element spacings in each axis.

Figure 4:
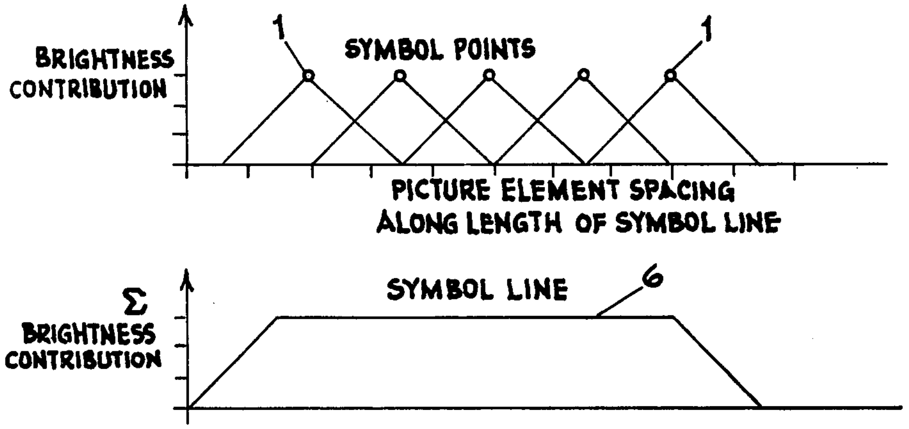

The most direct way of specifying the position, shape and dimensions of a symbol is by a series of coordinates. To make this approach possible all symbol points 1 must be treated identically irrespective of the shape of the symbol, and the slope of the line or lines forming the symbol, and yet the perceived brightness of the symbol line should be constant along its length and the perceived brightness of the symbol should remain constant when the symbol is displaced or rotated with respect to the picture element grid. The first condition is met by choosing the spacing of the symbol points (coordinate spacing) to match the brightness contribution function. As shown in FIG. 4, if the brightness contribution from each symbol point 1 falls to zero linearly in the symbol point spacing, and if the brightness contributions are combined linearly (added) then all the picture elements lying on a line 6 joining the symbol points will receive a constant brightness. Let us assume that the spacing between the symbol points is one and a half picture elements, requiring the brightness function to fall to zero in this distance.

Figure 5:
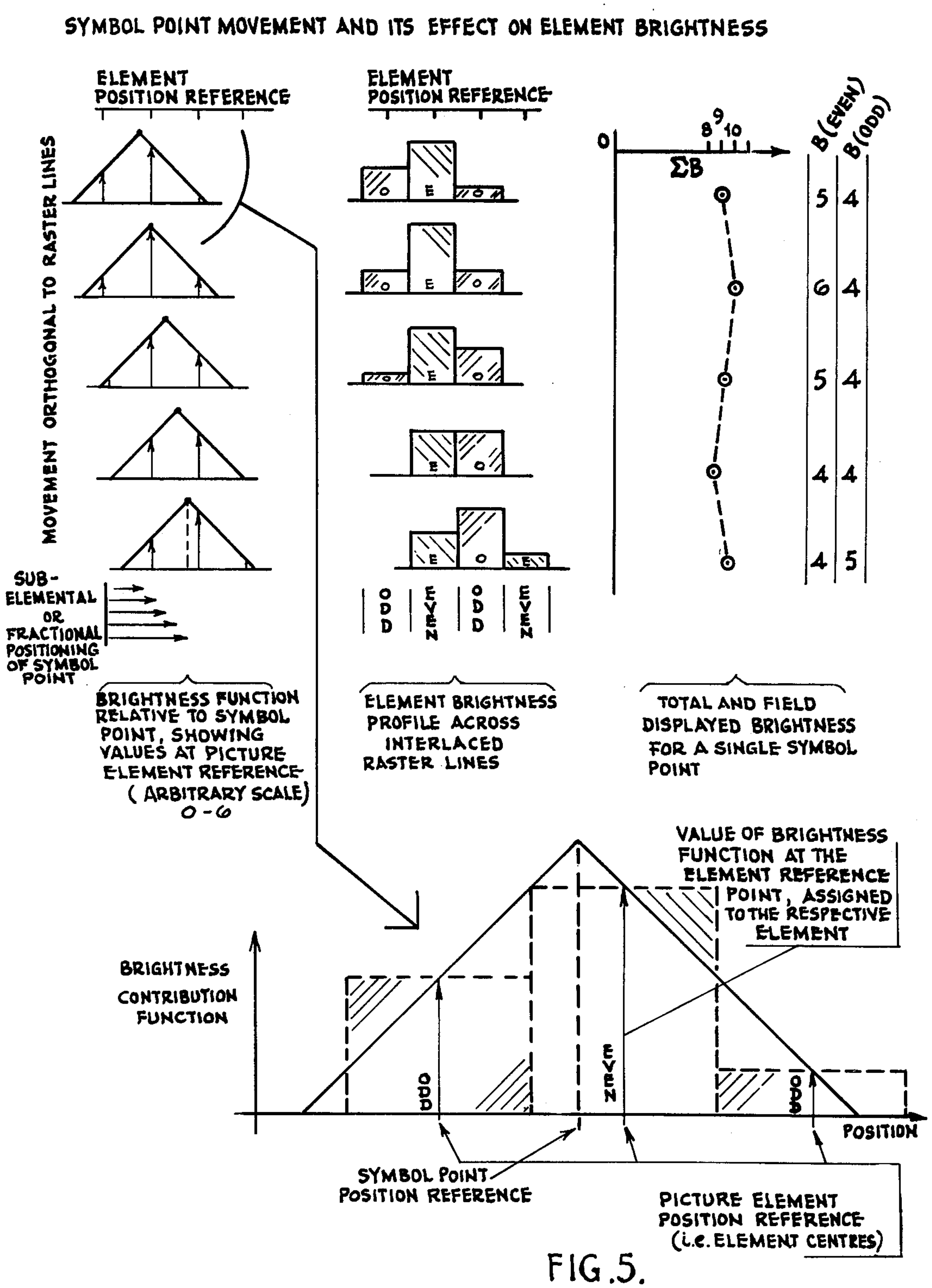

The second requirement will be met for a complete symbol if it is met for the individual symbol points on it, since the brightness of the symbol is a linear sum of symbol point brightness functions. Unfortunately the brightness function used so far does not meet this requirement and the effect may be seen in FIG. 5. As will be seen the total brightness $\Sigma\beta$ varies by 20% of the maximum value and the 30% difference in value between the odd and even fields causes a noticeable flicker.

Figure 6:
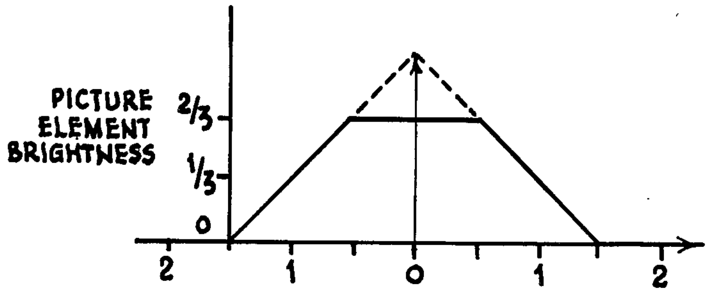
FIGS. 6 to 8 are further graphs illustrating the brightness contributions from symbol points.

This conflict is resolved by imposing an upper limit of substantially ⅔ maximum on the picture element brightness as shown in FIG. 6. A linear brightness function is assigned to each symbol point and the brightness contributions are summed to ascertain picture element brightness. The upper limit of ⅔ maximum brightness is then imposed on each picture element. Limiting the brightness level in this way enables the technique to tolerate errors in symbol point spacing of up to 0.5 picture elements without modulation of the main body of the symbol.

Figure 7:
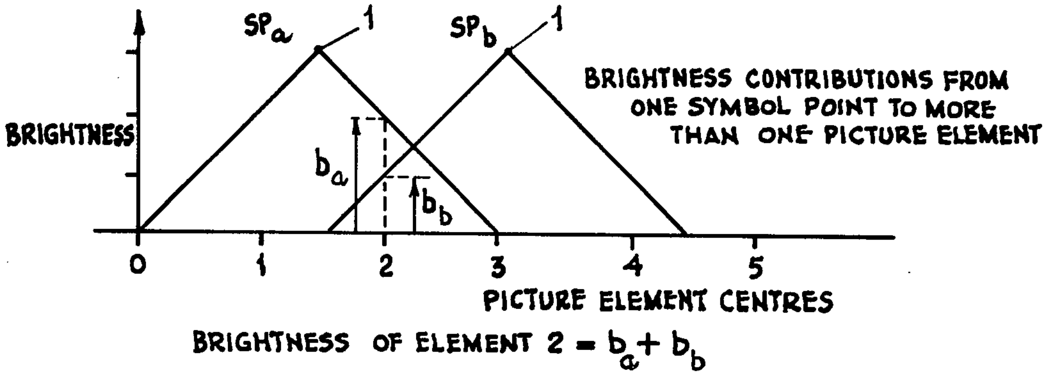

So far the brightness function has been considered with its origin at each symbol point, that is, the brightness contributions from one symbol point 1 to more than one picture element as shown in FIG. 7. In a raster system it is necessary to derive the total brightness of each picture element from all possible brightness contributions and to make this available at a through-rate of one picture element every hundred nanoseconds.

Figure 8:
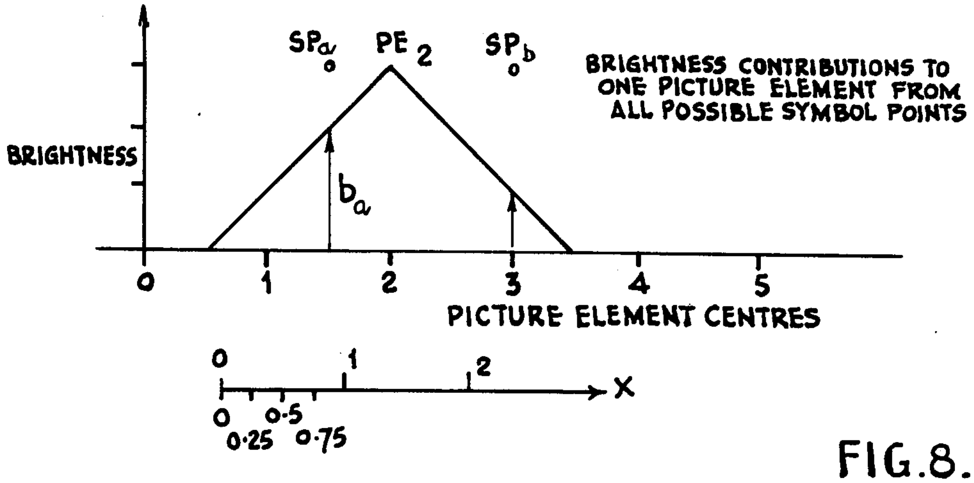
Figure 9:
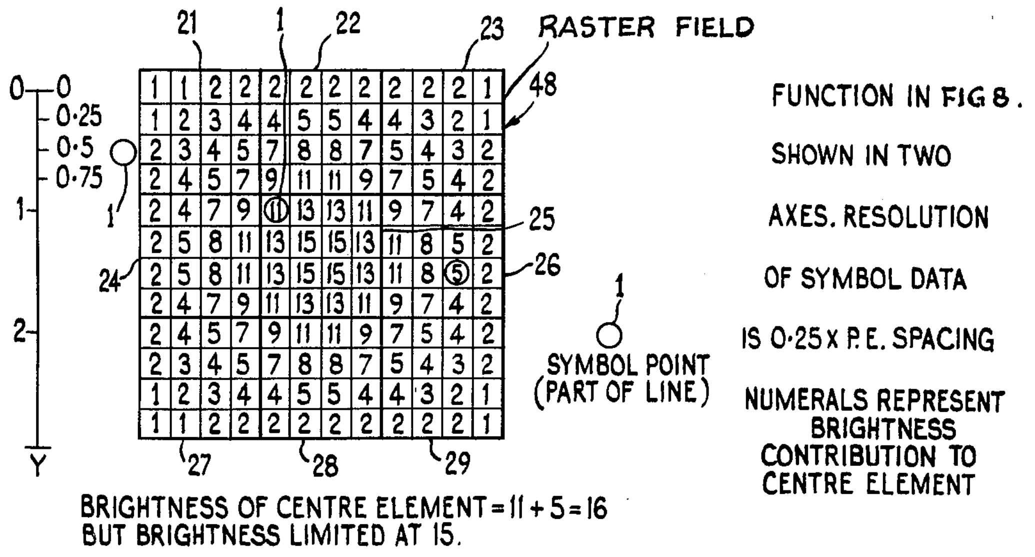
FIG. 9 is a three-by-three array of picture elements illustrating the possible locations of symbol points and indicating their brightness contributions.

This is possible if the brightness function is with respect to each picture element, that is, contributions to each picture element from all possible symbol points as shown in FIG. 8. Since the brightness function is symmetrical it remains unchanged when transformed in this way. If the non-zero part of the function is considered as covering a three-by-three array of picture elements, then in order to compute the required brightness of any picture element on the raster it is only necessary to know the location of any symbol points occuring in the array, i.e. the particular picture element and the eight picture elements surrounding it. As shown in FIG. 9 which depicts such an array, the possible locations of symbol points occurring in the three-by-three array of picture elements 21 to 29 are each marked with a brightness numeral in the range 1 to 15 indicative of its brightness contribution to the picture element 25 at the centre of the array. Therefore the brightness contribution of the symbol points to the picture element 25 at the centre of the array is the sum of the brightness numerals allocated to the symbol points forming the symbol. In FIG. 9 there are two such symbol points, shown ringed, which have respective brightness numerals 11 and 5. For a practical limitation of one symbol point per picture element the required brightness of each picture element of the array is given by nine or less brightness contributions. In fact for a symbol comprising a single displayed line there would be three or less brightness contributions.

Figure 11:
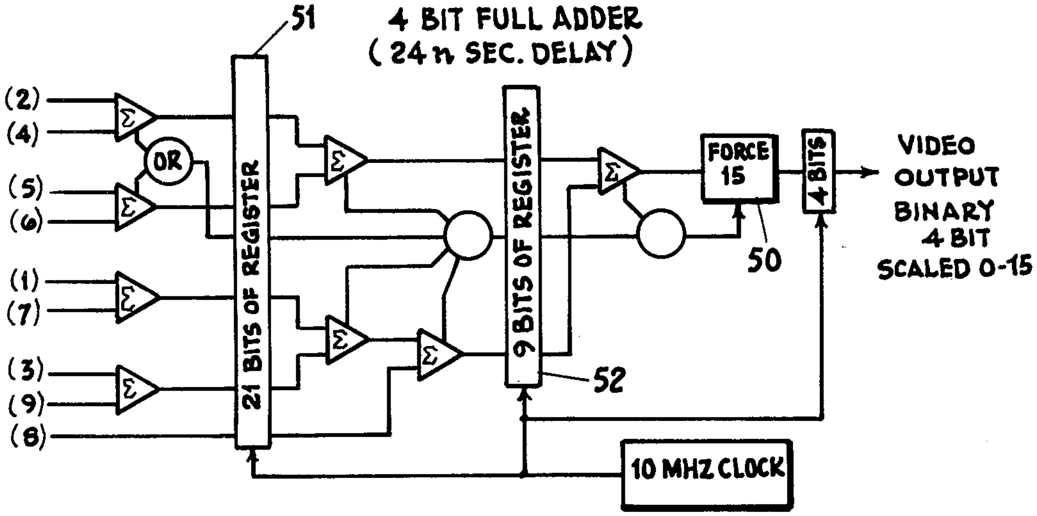
FIGS. 10, 11 and 12 are schematic circuit diagrams of parts of a display apparatus for displaying a symbol automatically.
Figure 10:
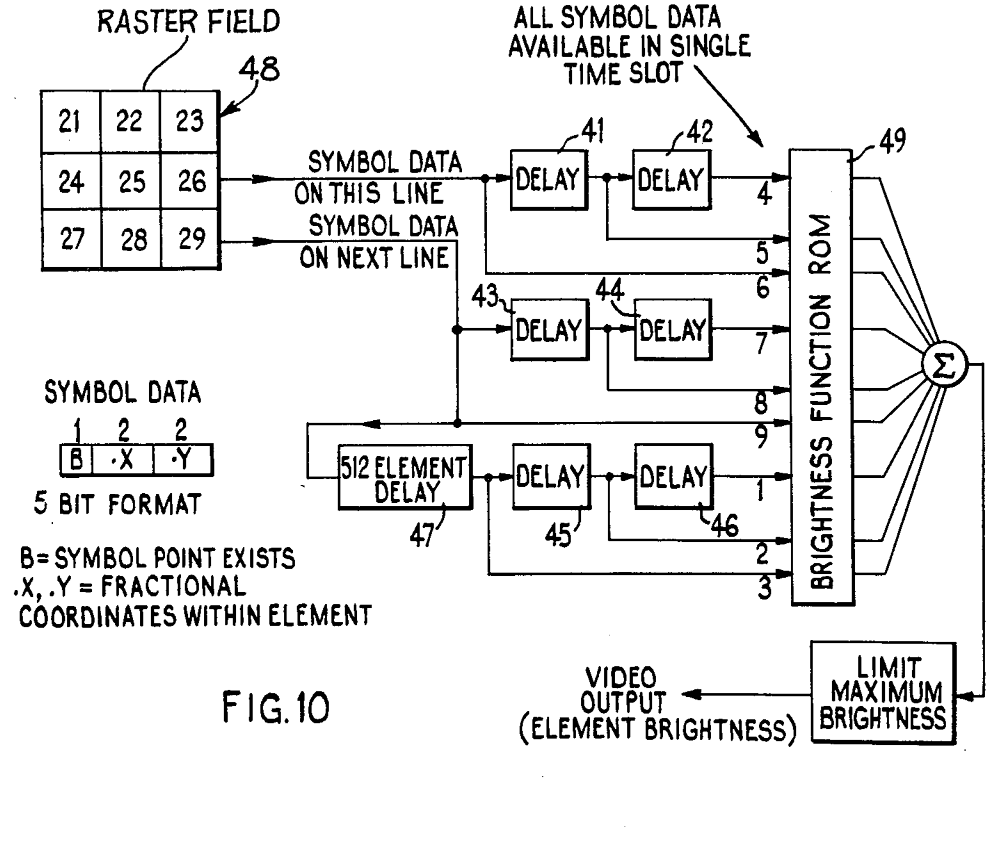
Figure 12:
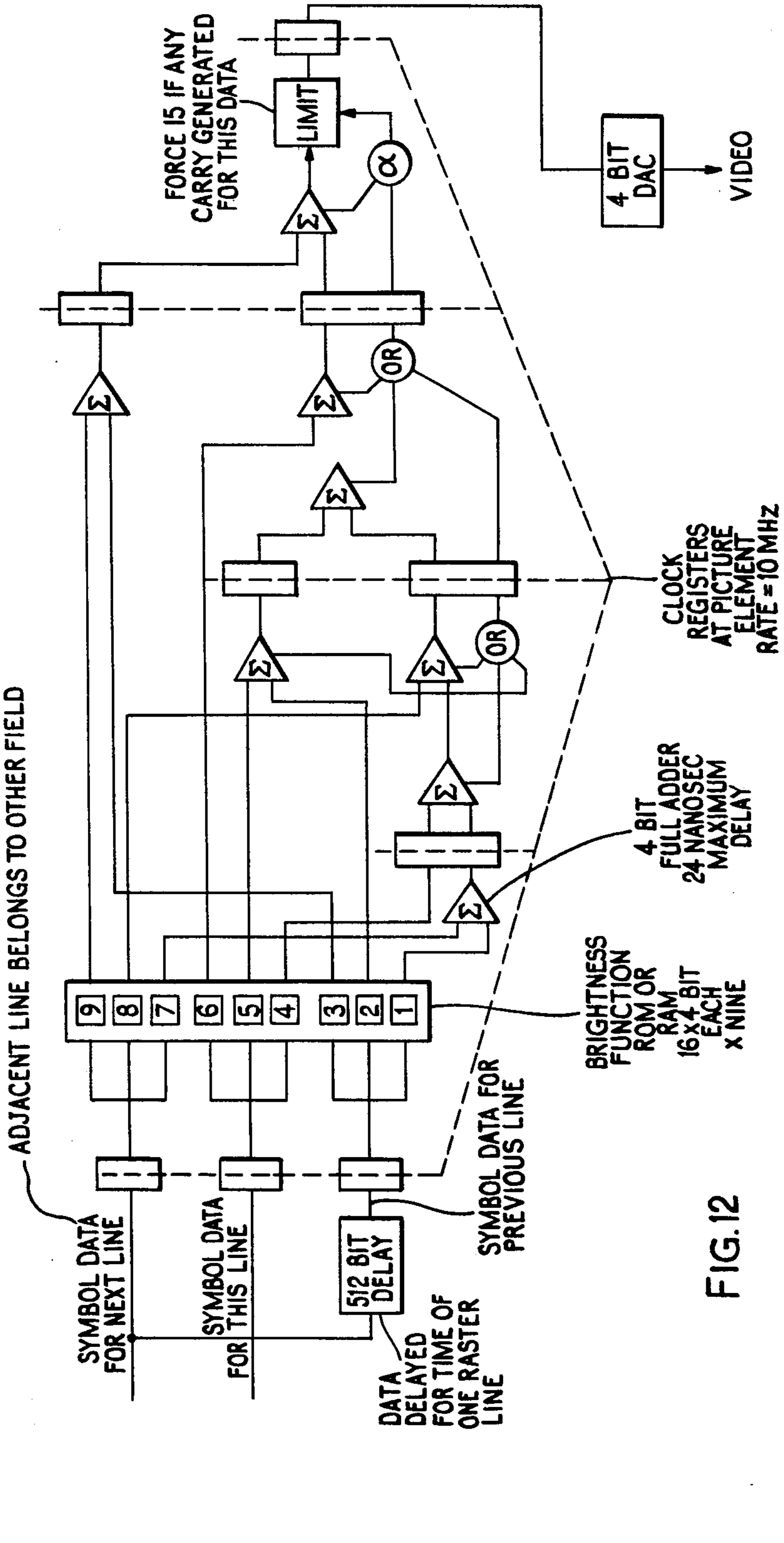

Referring now to FIGS. 10 to 12 which show apparatus for displaying a symbol automatically, in one raster field symbol data relating to each picture element on that raster field is generated in sequence, together with the symbol data for each adjacent picture element on the other raster field, for example, picture elements 26 and 29 shown in FIG. 10. Delay devices 41 to 47 are arranged to provide delays giving simultaneous access to all the data in the three-by-three picture element array 48. For each picture element in each possible three-by-three array such as 48 a 16 word×4 bit ROM memory 49 is addressed by the fractional co-ordinates of the symbol data. The 4 bit content is read only if a symbol point is present in that picture element area, and is then added to other possible brightness contributions in an adder tree shown in FIG. 11. An upper limit to the brightness is implemented by allowing any "carry" generated within the adder tree to force binary 15 at the final brightness output 50. Registers 51 and 52 used to hold temporary results in the adder tree may also be used to impose the relative delays required between the nine data paths. The circuit arrangement shown in FIG. 12 provides positional resolution of 0.25 picture elements in both horizontal and vertical axes without resorting to a system clock frequency higher than the video rate itself.

I claim:

1. A method of displaying a symbol on a display apparatus of the kind having a display area which is effectively a regular array of display elements on which a symbol is produced by brightening selected ones of the display elements, the method comprising: selecting the positions of a multiplicity of equally-spaced points on the display area required to define said symbol; for each said symbol point, determining the relative brightness contributions of a group of said display elements adjacent the position required for that symbol point so that said group of display elements create a subjective impression of that symbol point at its required position; for each said element, summing the brightness contributions required for each symbol point for which that element is one of a said group adjacent that symbol point; and setting the brightness of each element in accordance with the summation.

2. A method according to claim 1 wherein each said group of display elements covers a substantially square area having sides of length equal to twice the spacing between symbol points.

3. A method according to claim 2 wherein each said group of elements comprises a three-by-three array of elements.

4. An apparatus for generating a brightness control signal for input to a display apparatus of the kind having a display area which is effectively a regular array of display elements for displaying on the display area a symbol defined by a multiplicity of equally-spaced symbol points, the generating apparatus comprising: means for generating for each display element in turn the brightness contribution which is required for that element for each symbol point for which that element is one of a group of elements adjacent that symbol point, so that for each point the relative brightness contributions of the elements of the associated group create a subjective impression of that point; and means for summing for each element in turn said brightness contributions produced by said generating means for that element.

5. An apparatus according to claim 4 wherein said generating means comprises:

storage means which stores all possible brightness contributions required by that element;

and address means for reading out of said storage means in response to inputs defining the actual positions of symbol points the actual required brightness contributions of that element.

6. An apparatus according to claim 5 wherein said storage means comprises a separate section for each element in a group, and each section stores the possible brightness contributions required by a particular element of the group when the symbol point is at different positions in the element corresponding to the storage section.

7. An apparatus according to claim 6 wherein each said group of elements comprises a three-by-three array of elements and said particular element is the central element of the array.

8. An apparatus according to claim 5 wherein said address means is supplied sequentially with inputs representing the positions of said symbol points defining the symbol and the address means incorporates delay means arranged so that each storage section is address simultaneously by a symbol point position input corresponding to that storage section.

* * * * *